United States Patent Office 3,337,345
Patented Aug. 22, 1967

3,337,345
TASTE IMPROVEMENT FOR DAIRY PRODUCTS BY ADDING CYCLAMIC ACID
Richard Lawrence Hughes, West Roxbury, and Anne Josephine Neilson, Cambridge, Mass., and Wayne Kenneth Kuhr and Albin Joseph Slakis, Waukegan, Ill., assignors, by direct and mesne assignments, to Abbott Laboratories, North Chicago, Ill., a corporation of Illinois
No Drawing. Filed Dec. 16, 1964, Ser. No. 418,889
7 Claims. (Cl. 99—54)

The present invention relates to a method of improving flavor and texture of certain dairy-based food products. More particularly, it relates to an improvement of flavor and mouth-feel of specific products derived from milk.

Milk products in general constitute a very important segment of human nourishment but in many instances food products made from dairy products are deficient in some of their characteristics concerning flavor and texture. A particularly well-recognized deficiency is in the texture of skim milk which is generally described as being watery, thin, lacking body, and lacking flavor. Similar deficiencies are recognized in reconstituted dry milk powder, ice milk, low-priced ice creams, homogenized milk, puddings made from mixes containing non-fat dry milk solids, and the like. Many of these food products, however, are important foods in regular and certain restrictive diets and thus are used in great quantities.

It is the main object of the present invention to improve the flavor and texture characteristics of food products based on milk products; it is a particular object of this invention to produce a fuller, creamier mouth-feel of food products based on dairy products which have low fat contents. Other objects will be apparent from the following disclosure and examples.

The above objects are accomplished by the process of the present invention whereby between 0.1% and 0.3% of cyclohexylsulfamic acid (hereinafter referred to as cyclamic acid) is added to a dairy-based food product containing at least 4.2% of lactose, said amount of cyclamic acid being based on the amount of lactose present. Cyclamic acid is the sour-sweet tasting acid of which the sodium and calcium salts are widely used as artificial sweetening agents. However, when the above salts are used in their capacity as sweeteners, they are added in quantities which produce the desired sweetness in the food product concerned. According to the method of the present invention, cyclamic acid is used in amounts close to or below the threshold level thereof, which means that its own sour-sweet characteristic does not produce any effect of its own in the dairy product concerned.

Using cyclamic acid within the above amounts, surprisingly, improves not only the body and fullness of the dairy product to which it is added, but also brings out more of the natural flavor of said dairy product, simultaneously removing or greatly reducing the chalky and cowy flavors often detected by the consumer.

The diary products defined above as having a minimum content of 4.2% by weight of lactose include the following products: whole milk, skim milk, ice milk, ice cream, non-fat dry milk, evaporated milk, non-sweetened condensed milk, dry whole milk, buttermilk, and the like.

The effects of the simple method of adding between 0.1% and 0.3% of cyclamic acid to dairy products containing at least 4.2% of lactose are better described in the following examples which are illustrations only and are not meant as limitations of the invention. In all examples, the control samples and the samples treated by the present method were compared by a highly specialized flavor panel using the "Flavor Profile Analysis" method established by Arthur D. Little, Inc. and published in "Flavor Research and Food Acceptance" (Reinhold Publishing Corporation, New York, 1958, pages 65 ff.). The flavor profile method of evaluation was used to characterize the flavor-notes, order of their appearance, quality of note, degree of blend, and to assess the type and intensity of changes in flavor between the test and the control samples. Wherever the samples had to be physically treated to incorporate the cyclamic acid uniformly, the control sample was treated in the same fashion so that the textures would be identical.

Examples

A nationally known brand of ice milk was melted, divided into two parts, and to one part was added 0.2% by weight of cyclamic acid based on the amount of lactose present in said sample as established by analysis. After blending the two portions in identical manner, both portions were refrozen and submitted to the flavor panel. The flavor of the control sample was described as being smooth with a custardly vanilla flavor. In the test sample the custard impression is significantly increased and a fuller texture with more creamy character was noted.

A sample of a nationally known brand of evaporated milk was reconstituted to the equivalent of natural milk by the addition of water. The flavor of this reconstituted milk was described by the panel as being sweet, cowy, custardy, with boiled-milk and old-cream characteristics. In a test sample prepared in the same way but after adding 0.2% by weight of cyclamic acid, as based on the amount of lactose present, the flavor difference observed is the reduction of the negative flavor factors, such as cowiness, boiled-milk and old-cream aromatics, and the increase in creaminess of the consumer-ready product.

By adding 0.01 gram of cyclamic acid to 100 grams of fresh whole milk containing 4.8% of lactose (0.21% cyclamic acid based on lactose) the obtained product is sweeter, less sour, fuller, less cowy, and significantly more creamy than the control sample.

By adding 0.01% by weight of cyclamic acid to skim milk containing 4.6% of lactose (0.22% of cyclamic acid based on lactose), texture and flavor of the obtained product much more closely resembles that of whole milk than the control sample: the test sample has a full, well-blended and creamy character. By adding 0.1–0.3% of cyclamic acid by weight of the lactose present in non-fat dry milk powder to the latter and reconstituting the milk as directed, the product obtained shows the same improvement in flavor, texture, blend and cremainess as in the above test. However, when 0.5% cyclamic acid is added, a definite sweetness is observed in the milk so prepared.

The addition of 0.24% by weight of cyclamic acid based on the amount of lactose present to strawberry ice cream produces a creamier product with a significantly more pronounced fruit identity which appears earlier in the development of flavor than that present in the control sample. The control sample as well as the test sample were treated in identical manner in an electric beater to produce the same physical texture. When the strawberry ice cream is replaced by vanilla ice cream, the vanilla flavor is much enhanced together with a distinct improvement in the creaminess of the product.

By adding 0.2% by weight of cyclamic acid to an instant chocolate pudding, said amount of cyclamic acid being based on the lactose content of the milk to be used, the flavor of the chocolate pudding prepared according to the directions is less papery, less starchy, and has a more lasting chocolate note than that of a pudding prepared in identical manner but without the cyclamic acid addition. When the chocolate pudding mix is replaced with an instant vanilla pudding mix, the flavor of the test sample is more custardy and more vanilla-like, with creamier texture when compared with the standard product. By adding cyclamic acid in an amount of 0.5% of the amount of lactose present, the resulting pudding is slightly too sweet, somewhat bland, the blend of flavor notes being too tight. When an instant vanilla pudding formula was prepared according to directions but using reconstituted non-fat dry milk solids in place of the whole milk specified in the directions, and adding to a portion of the mix 0.2% of cyclamic acid as based on the lactose content of the powdered milk, the resulting test sample is creamier, has more vanilla flavor and shows less papery characteristics than the control sample prepared in the same manner but without cyclamic acid. Also, the dry-milk flavor note present in the control sample is significantly reduced in the test sample, the latter being also better blended and of smoother, fuller texture than the control.

It will be seen from the above examples that the addition of between 0.1% and 0.3% by weight of cyclamic acid, when said amount is based on the lactose present, produces an increase in fullness of the flavor, an increase in the identifying flavor characteristics and aromatics, an increase in creaminess (of flavor as well as of texture) and a decrease in starchiness and papery, cowy aromatics over the corresponding control samples. This is particularly surprising in view of the very small amounts of cyclamic acid used, said amount resulting in a concentration of between 0.005 and 0.03% of cyclamic acid in the final, consumption-ready product.

As pointed out above, the amount of cyclamic acid to be added is critical since, when using more than 0.3% of the lactose present, detrimental effects are observed: the flavor of the products is too well blended being bland and sweet and losing its characteristic flavor identity. When amounts of below 0.1% on the above basis of cyclamic acid are used, the flavor and texture improvement is not significant enough to be observed by the average consumer. For most instances, an amount of from 0.15–0.25 part by weight of cyclamic acid per 100 parts by weight of lactose present produces excellent results. This amount may be added, where practical, to the dry mix, e.g. to the dry milk powder, condensed milk, vanilla pudding mix, ice cream, etc, or the amount may be added just prior to consumption of the dairy products specified above, e.g. in milk, skim milk, etc. Obviously, in each instance care should be taken in distributing the cyclamic acid uniformly in the above dairy product.

Others may practice the invention in any of the numerous ways which will be suggested to one skilled in the art by the present disclosure. All such practice of the invention is considered a part hereof provided it falls within the scope of the appended claims.

We claim:

1. The process of adding between 0.1% and 0.3% of cyclamic acid to a dairy product containing at least 4.2% of lactose, said amount of cyclamic acid being based on the amount of lactose present, and blending said cyclamic acid uniformly into said dairy product.

2. The process of claim 1 wherein said dairy produced is skim milk.

3. The process of claim 1 wherein said dairy product is non-fat dry milk solids.

4. The process of claim 1 wherein said dairy product is ice cream.

5. The process of claim 1 wherein said dairy product is ice milk.

6. The process of claim 1 wherein said dairy product is a pudding formulation.

7. A dairy product having at least 4.2% by weight of lactose and containing between 0.1% and 0.3% of cyclamic acid by weight of said lactose, said cyclamic acid being uniformly distributed in said dairy product.

References Cited

UNITED STATES PATENTS 2,876,104  3/1959  Bliudzius et al. _____ 99—141
2,876,107  3/1959  Jucaitis et al. _____ 99—141

A. LOUIS MONACELL, *Primary Examiner.*

H. H. KLARE, *Assistant Examiner.*